US006653440B2

(12) United States Patent  
Hirokane et al.

(10) Patent No.: US 6,653,440 B2
(45) Date of Patent: Nov. 25, 2003

(54) PROCESS FOR PRODUCING COPOLYESTER RESIN

(75) Inventors: Takeshi Hirokane, Kanagawa (JP); Tsuyoshi Ikeda, Kanagawa (JP); Shojiro Kuwahara, Kanagawa (JP)

(73) Assignee: Mitsubishi Gas Chemical Company, Tokyo (JP)

( * ) Notice: Subject to any disclaimer, the term of this patent is extended or adjusted under 35 U.S.C. 154(b) by 0 days.

(21) Appl. No.: 10/288,308

(22) Filed: Nov. 6, 2002

(65) Prior Publication Data

US 2003/0100702 A1 May 29, 2003

(30) Foreign Application Priority Data

Nov. 13, 2001 (JP) ........................................ 2001-347341

(51) Int. Cl.[7] ............................................... C08G 65/00
(52) U.S. Cl. ...................... 528/406; 528/272; 528/302; 528/307; 528/308; 528/308.6
(58) Field of Search ................................ 528/272, 302, 528/307, 308, 308.6, 406

(56) References Cited

U.S. PATENT DOCUMENTS

| 2,945,008 | A | 7/1960 | Caldwell et al. |
| 3,372,148 | A | 3/1968 | Wiener et al. |
| 3,399,170 | A | 8/1968 | Blaschke et al. |
| 4,004,878 | A | 1/1977 | Magosch et al. |
| 5,070,176 | A | 12/1991 | Strand |
| 5,198,530 | A | 3/1993 | Kyber et al. |
| 5,340,908 | A | 8/1994 | Idage et al. |
| 5,391,688 | A | 2/1995 | Mazaki et al. |
| 6,084,055 | A | 7/2000 | Brunelle et al. |
| 6,232,435 | B1 | 5/2001 | Heitz et al. |

FOREIGN PATENT DOCUMENTS

| DE | 20 08 984 | 9/1971 |
| DE | 195 33 797 | 3/1997 |
| EP | 0 556 054 | 8/1993 |
| JP | 62-230874 | 10/1987 |
| JP | 62-265361 | 11/1987 |

OTHER PUBLICATIONS

European Search Report mailed Feb. 3, 2003, for EP 02 02 4790.

Primary Examiner—Samuel A. Acquah
(74) Attorney, Agent, or Firm—Antonelli, Terry, Stout & Kraus, LLP

(57) ABSTRACT

In the production method of the present invention, a copolyester of intended sublimable diol proportion is produced by the reaction of a dicarboxylic acid and/or an ester-forming derivative thereof with a sublimable diol and a non-sublimable diol with an increased conversion of the sublimable diol. Since the escape of the sublimable diol is effectively prevented, the process solves the problem of clogging pressure-reduced pipes, etc. of an apparatus for polyester resin production.

11 Claims, No Drawings

PROCESS FOR PRODUCING COPOLYESTER RESIN

BACKGROUND OF THE INVENTION

1. Field of the Invention

The present invention relates to a process for producing a copolyester resin by polymerizing a dicarboxylic acid and/or an ester-forming derivative thereof with a sublimable diol and a non-sublimable diol, in which a conversion of the sublimable diol is increased to efficiently produce the intended copolyester resin, and the amount of the escaped sublimable diol out of a reaction system by sublimation is reduced to thereby stably produce the copolyester resin without clogging vacuum-reduced pipes, etc. of an apparatus for polyester resin production.

2. Description of the Prior Art

Polyethylene terephthalate (hereinafter occasionally referred to merely as PET) has been widely used for producing films, sheets and hollow containers because of its excellent transparency, mechanical properties, melt stability, solvent resistance, aroma retention, recycling property, etc. However, since the heat resistance of PET is not necessarily sufficient, extensive studies have been made to modify PET by copolymerization.

It is known in the art that the modification by a cyclic acetal compound improves the heat resistance, adhesiveness, flame retardance, etc. of polymers because of the rigid cyclic acetal skeleton and acetal linkages.

For example, U.S. Pat. No. 2,945,008 teaches that PET modified by 3,9-bis(1,1-dimethyl-2-hydroxyethyl)-2,4,8,10-tetraoxaspiro[5.5]undecane (hereinafter may be referred to merely as SPG) exhibits a high glass transition temperature and, i.e., a high heat resistance. Japanese Patent No. 2971942 discloses a copolyester container having a high transparency and a high heat resistance, and a production method thereof. The proposed copolyester is produced from terephthalic acid, 1,4-butane diol, and a glycol having a cyclic acetal skeleton. Japanese Patent Publication No. 7-13128 discloses in the working example a polyester exhibiting a high heat resistance and a high transparency which is produced by using a diol having a cyclic acetal skeleton.

Regarding the improvement in the adhesiveness by the acetal linkages, Japanese Patent Publication Nos. 4-22954, 5-69151 and 6-29396 and Japanese Patent Application Laid-Open No. 4-88078 disclose polyester adhesives, adhesive compositions and coating agents containing a polyester produced from a dicarboxylic acid and a diol, such as SPG, having a cyclic acetal skeleton.

Other polyesters produced from a dicarboxylic acid and a diol having a cyclic acetal skeleton can be found in Japanese Patent Application Laid-Open No. 3-130425 which discloses a combined filament yarn made of different shrinkage filaments, Japanese Patent Application Laid-Open No. 8-104742 which discloses a modified polyester film, Japanese Patent Application Laid-Open No. 9-40762 which discloses a biodegradable polyester, Japanese Patent Publication No. 3-14345 which discloses an electrostatic developing toner, and Japanese Patent Application Laid-Open No. 2000-344939 which discloses a flame-retardant resin composition.

However, these prior art publications fail to teach or disclosed the details of the polymerization methods for producing the proposed polyesters.

In general, polyester resins are produced by a transesterification or a direct esterification. In transesterification, a dialkyl dicarboxylate monomer is subjected to transesterification with a diol charged about two times by mol excess to the dialkyl dicarboxylate monomer at ordinary temperature to obtain an oligomer of a diol ester of the dicarboxylic acid, and then the resulting oligomer is polycondensed under reduced pressure.

However, when copolyesters are produced using a diol component comprising ethylene glycol and SPG by the transesterification method, ethylene glycol takes part in the transesterification in preference to SPG, this making it difficult to directly obtain the intended copolyester. Even though the transesterification rate of the sublimable diol is not necessarily lower than that of the non-sublimable diol, it is still difficult to obtain the intended copolyester directly.

Further, unreacted sublimable SPG remaining in the oligomer is sublimated by temperature rise and pressure reduction in the subsequent polycondensation step, resulting in clogging of pressure-reduced pipes of a reactor. If SPG escapes from the reaction solution by sublimation during the polycondensation reaction, the content of SPG units in the resulting polyester resin becomes far less than the intended content.

In the direct esterification process, a dicarboxylic acid is esterified with a diol to obtain an oligomer of a diol ester of the dicarboxylic acid, followed by the polycondensation of the oligomer under reduced pressure. However, in the production of a copolyester using SPG and ethylene glycol by the direct esterification process, it is also difficult to stably produce the copolyester because the sublimation of SPG also causes the clogging of pressure-reduced pipes of a reactor as in the case of transesterification process.

None of the above prior art publications consider the method for efficiently oligomerizing the sublimable diol having a cyclic acetal skeleton, nor address the problems such as the clogging of pressure-reduced pipes of a reactor and the escape of the diol out of the reaction system each due to sublimation of the sublimable diol.

SUMMARY OF THE INVENTION

In view of the above problems, an object of the present invention is to provide a process for producing a copolyester resin by reacting a dicarboxylic acid and/or an ester-forming derivative thereof with a sublimable diol and a non-sublimable diol in an improved conversion of the sublimable diol in the polycondensation reaction. Another object of the present invention is to provide a method for stably producing a copolyester resin without clogging pressure-reduced pipes of an apparatus for polyester resin production by reducing the loss of the sublimable diol due to the escape from the reaction system by sublimation.

As a result of extensive research in view of the above objects, the inventors have reached a process for producing a copolyester resin by reacting a dicarboxylic acid and/or an ester-forming derivative thereof with a sublimable diol and a non-sublimable diol, which comprises a step of producing an oligomer by a transesterification reaction or an esterification reaction, a step of polycondensing the oligomer under reduced pressure to increase the molecular weight, and an additional step of removing the non-sublimable diol from the reaction system by distillation, the additional step intervening between the step of producing the oligomer and the step of polycondensing the oligomer. With the step of removing the non-sublimable diol, the conversion of the sublimable diol can be increased to a predetermined level or higher mainly by transesterification reaction. This in turn reduces the concentration of unreacted sublimable diol remaining in the oligomer to reduce the amount of escaped sublimable diol due to sublimation during the polycondensation step, thereby making it possible to produce an intended copolyester. The additional step of removing the non-sublimable diol is also effective for preventing the clogging of pressure-reduced pipes of an apparatus for producing polyester resin, resulting in stable production of the intended copolyester. The present invention has been accomplished on the basis of the above findings.

Thus, the present invention provides a process for producing a copolyester resin comprising a dicarboxylic acid constituting unit derived from a dicarboxylic acid and/or an ester-forming derivative thereof and a diol constituting unit derived from a sublimable diol and a non-sublimable diol, and containing a constituting unit derived from the sublimable diol in an amount of 5 to 60 mol % based on the diol constituting unit, the process comprising (1) a step 1 for producing an oligomer by the reaction of the dicarboxylic acid and/or the ester-forming derivative thereof with the sublimable diol and the non-sublimable diol in the presence of the non-sublimable diol in excess of the amount of the non-sublimable diol for constituting the copolyester resin, while distilling off water and/or alcohol generated from the ester-forming derivative from the reaction system until a conversion of the dicarboxylic acid and/or the ester-forming derivative reaches 85 mol % or more; (2) a step 2 for subjecting the oligomer to transesterification reaction while distilling off mainly the non-sublimable diol at 150 to 250° C. under a pressure not higher than a vapor pressure of the non-sublimable diol but not lower than a vapor pressure of sublimable diol until an amount of the sublimable diol remaining in an oligomer solution is reduced to 10% by weight or less based on the sublimable diol added to the reaction system; and (3) a step 3 for increasing the molecular weight of the oligomer under further reduced pressure.

DETAILED DESCRIPTION OF THE INVENTION

The present invention will be described in detail below.

The process for producing a copolyester resin according to the present invention comprises Step 1, Step 2 and Step 3. In Step 1 of oligomerization, a dicarboxylic acid and/or an ester-forming derivative thereof (hereinafter, these may be collectively referred to as "dicarboxylic acid component") and a sublimable diol and a non-sublimable diol (hereinafter, these may be collectively referred to as "diol component") are subjected to esterification or transesterification while removing water or alcohol being generated by distillation to produce an oligomer of a diol ester of the dicarboxylic acid. In the next Step 2, the conversion of the sublimable diol in the transesterification reaction is increased by mainly removing the non-sublimable diol by distillation. In the final Step 3, the molecular weight of the oligomer is increased by mainly removing the non-sublimable diol by distillation.

In the copolyester production process of the present invention, a dicarboxylic acid and/or an ester-forming derivative thereof, a sublimable diol and a non-sublimable diol are used as starting monomers.

The sublimable diols referred to in the present invention are diols having a sublimation pressure of 600 kPa or lower at 0 to 300° C., while the non-sublimable diols are diols other than the sublimable diols.

Examples of the sublimable diol include, but not limited to, neopentyl glycol, catechol, 2,3-naphthalenediol, 3,9-bis (1,1-dimethyl-2-hydroxyethyl)-2,4,8,10-tetraoxaspiro [5,5] undecane, and 5-methylol-5-ethyl-2-(1,1-dimethyl-2-hydroxyethyl)-1,3-dioxane.

The addition amount of the sublimable diol is about 5 to about 60 mol % based on the dicarboxylic acid component. By using the sublimable diol in the above amount range, the content of the sublimable diol unit in the diol constituting unit of the resulting copolyester resin may be regulated within 5 to 60 mol %.

The non-sublimable diol used in the present invention is not particularly restricted, and preferably has a vapor pressure higher than that of the sublimable diol at an esterification temperature or a transesterification temperature.

Examples of the non-sublimable diol include aliphatic diols such as ethylene glycol, trimethylene glycol, 1,4-butane diol, 1,5-pentane diol, 1,6-hexane diol, diethylene glycol and propylene glycol; polyether compounds such as polyethylene glycol, polypropylene glycol and polybutylene glycol; alicyclic diols such as 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornene dimethanol, tricyclodecane dimethanol and pentacyclodecane dimethanol; bisphenol compounds such as 4,4'-(1-methyethylidene) bisphenol, methylenebisphenol (bisphenol F), 4,4'-cyclohexylidenebisphenol (bisphenol Z) and 4,4'-sulfonylbisphenol (bisphenol S); alkyleneoxide adducts of the bisphenol compounds; aromatic dihydroxy compounds such as hydroquinone, resorcin, 4,4'-dihydroxybiphenyl, 4,4'-dihydroxydiphenyl ether and 4,4'-dihydroxydiphenyl benzophenone; and alkyleneoxide adduct of the aromatic dihydroxy compounds. Of these non-sublimable diols, ethylene glycol is especially preferred in view of mechanical properties of the resulting copolyester resin and production costs.

Examples of the dicarboxylic acid component include, but not limited to, aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid, pentacyclodecanedicarboxylic acid, 3,9-bis(1,1-dimethyl-2-carboxyethyl)-2,4,8,10-tetraoxaspiro[5,5]undecane and 5-carboxy-5-ethyl-2-(1,1-dimethyl-2-carboxyethyl)-1,3-dioxane; ester-forming derivatives of the aliphatic dicarboxylic acids; aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid and tetralindicarboxylic acid; and ester-forming derivatives of the aromatic dicarboxylic acids.

Of these dicarboxylic acid components, preferred are aromatic dicarboxylic acids and/or ester-forming derivatives thereof in view of the mechanical properties and thermal properties of the resulting copolyester resin, and more preferred are terephthalic acid, isophthalic acid, 2,6-naphthalenedicarboxylic acid and/or ester-forming derivatives thereof The ester-forming derivative of the dicarboxylic acids referred to herein is a compound capable of forming a dicarboxylic acid ester, and includes, for example, dialkyl esters, dihalides, and diamides of dicarboxylic acid. Of these ester-forming derivatives, preferred is the dialkyl ester of dicarboxylic acid, and more preferred is a dimethyl ester of dicarboxylic acid.

In the present invention, oxy acids such as glycolic acid, lactic acid, 2-hydroxyisobutyric acid and 3-hydroxybutyric acid; monoalcohols such as butyl alcohol, hexyl alcohol and octyl alcohol; tri- or higher valent alcohols such as trimethylolethane, trimethylolpropane, glycerin and pentaerythritol; and monocarboxylic acids such as benzoic acid, propionic acid and butyric acid may be also used unless the use thereof adversely affects the objects and effects of the present invention.

The process for producing the copolyester resin according to the present invention may be carried out in a conventionally known apparatus for the production of polyester resins without specific modification.

Step 1 is an oligomerization step for producing an oligomer of a diol ester of a dicarboxylic acid by the esterification reaction and/or transesterification reaction between the dicarboxylic acid component and the diol component while distilling off water and/or alcohol generated from the ester-forming derivative. The oligomer solution referred to herein is a mixture of an oligomer of a diol ester of the dicarboxylic acid component having a polymerization degree of 10 or less in average and the monomer component comprising the unreacted dicarboxylic acid component and diol component.

In Step 1, the diol component is charged in excess, usually about 1.3 to 10 times by mol excess to the dicarboxylic acid component. In practice, the non-sublimable diol is charged in excess, i.e., 1.3 to 10 times by mol excess to the non-sublimable diol that will constitute the resulting copolyester resin.

Step 1 for oligomerization is carried out preferably at 80 to 240° C., more preferably at 100 to 230° C., preferably under 40 to 600 kPa, more preferably under 80 to 400 kPa, although not limited thereto. The conversion of the dicarboxylic acid component in Step 1 is 85 mol % or higher, preferably 90 mol % or higher. If less than 85 mol %, a practically sufficient rate of the transesterification reaction cannot be attained in the subsequent Step 3, unfavorably resulting in not only an excessively long polycondensation reaction time and an increased production costs, but also undesired excessive heat history to the resulting copolyester resin.

Step 1 is carried out in the absence or presence of a catalyst. The catalyst known in the art is usable in the present invention. Examples of the catalyst include, but not limited to, alkoxides of sodium or magnesium; aliphatic acid salts, carbonates, phosphates, hydroxides, chlorides or oxides of zinc, lead, cerium, cadmium, manganese, cobalt, lithium, sodium, potassium, calcium, nickel, magnesium, vanadium, aluminum, titanium, germanium, antimony or tin; and magnesium metal. These catalysts may be used alone or in combination of two or more. The amount of the catalyst used in Step 1 is preferably 0.0001 to 5 mol % based on the dicarboxylic acid component.

In Step 2, the transesterification reaction is carried out until the amount of the sublimable diol remaining in the oligomer solution (residual ratio of the sublimable diol) is reduced to 10% by weight or less based on the total amount of the sublimable diol added to the reaction system, while distilling off mainly the non-sublimable diol at a reaction temperature of 150 to 250° C. under a reaction pressure not higher than the vapor pressure of the non-sublimable diol but not lower than the vapor pressure of the sublimable diol.

The reaction temperature of Step 2 is preferably 150 to 250° C., more preferably 180 to 240° C., and still more preferably 200 to 230° C. The reaction pressure of Step 2 is preferably not higher than the vapor pressure of the non-sublimable diol but not lower than the vapor pressure of the sublimable diol at the above temperature range, and particularly preferably 10 to 100 kPa. By regulating the reaction temperature and the reaction pressure within the above ranges, the non-sublimable diol can be efficiently distilled off out of the reaction system without causing substantial sublimation of the sublimable diol.

The residual ratio of the sublimable diol remaining in the oligomer solution in Step 2 is preferably 10% by weight or less, more preferably 7% by weight or less, and still more preferably 5% by weight or less. The residual ratio can be regulated within the above range relatively easily by distilling off the non-sublimable diol out of the reaction system.

The amount of the non-sublimable diol to be distilled off is not particularly restricted, but preferably so controlled that the amount of the diol component in the oligomer solution is reduced to 2.0 mol or lower, more preferably 1.7 mol or lower, still more preferably 1.5 mol or lower per one mole of the dicarboxylic acid component in the oligomer solution (dicarboxylic acid component constituting the oligomer plus unreacted dicarboxylic acid component). By distilling off the non-sublimable diol in an amount within the above range, the equilibrium moves toward the reaction of the sublimable diol to reduce the residual ratio of the sublimable diol to 10% by weight or lower.

By carrying out the transesterification reaction in the manner as described above, the conversion of the sublimable diol is increased, thereby enabling the production of the intended copolyester resin. Further, the amount of the sublimable diol escaping from the reaction system by sublimation is reduced, and the clogging of pressure-reduced pipes of a apparatus for polyester resin production is prevented. As a result, it becomes possible to stably produce the intended copolyester resin.

Step 2 is carried out in the absence or presence of a catalyst. As the catalyst, there may be used conventionally known catalysts without particular limitations. Examples of the catalyst include the same catalysts as previously described with respect to the catalyst for Step 1. These catalysts may be used alone or in combination of two or more. Also, the catalyst used in Step 1 may be continuously used in Step 2. The amount of the catalyst in Step 2 is preferably 0.0001 to 5 mol % based on the dicarboxylic acid component.

In Step 3, the oligomer from Step 2 is polycondensed to increase its molecular weight while distilling off mainly the non-sublimable diol being generated as a result of polycondensation. The temperature of the reactant mixture is preferably 150 to 250° C. at the initial stage of Step 3, and more preferably is raised with reduction of the reaction pressure to finally 250 to 300° C. When exceeding 300° C., undesired side reactions such as thermal decomposition would occur during the polycondensation reaction.

The pressure may be 10 to 100 kPa at the initial stage of Step 3. In a preferred embodiment of the invention, the pressure is gradually reduced as the reaction proceeds to a final pressure of preferably 400 Pa, more preferably 200 Pa, and still more preferably 100 Pa. By setting the final pressure of Step 3 at 400 Pa or lower, the rate of polycondensation may be maintained at a higher level, and undesired side reactions such as depolymerization and thermal decomposition may be suppressed. Step 3 is continued until the polymerization degree of the resulting copolyester resin reaches 20 or higher in average.

In the process for producing the copolyester resin according to the present invention, the amount of the sublimable diol that is incorporated to constitute the copolyester resin (hereinafter may be referred to "incorporation rate of the sublimable diol") is 95% by mol or higher, preferably 97% by mol or higher.

Step 3 is carried out in the absence or presence of a catalyst. As the catalyst, there may be used conventionally known catalysts without particular limitations. Examples of the catalyst include the same catalysts as previously described with respect to the catalyst for Step 1. These catalysts may be used alone or in combination of two or more. Also, the catalyst used in Step 1 may be continuously used in Step 3. The amount of the catalyst in Step 3 is preferably 0.0001 to 5 mol % based on the dicarboxylic acid component.

In the process for producing the copolyester resin of the present invention, known etherification inhibitors such as amine compounds, various stabilizers such as heat stabilizers and light stabilizers, and polymerization regulators may be combinedly used. Various phosphorus compounds such as phosphoric acid, phosphorous acid and phenylphosphonic acid may be effectively used as heat stabilizers. In addition, light stabilizers, antistatic agents, lubricants, antioxidants, and mold releasing agents may be added.

The present invention will be described in more detail by reference to the following examples. However, it should be noted that the following examples are merely illustrative and not intended to limit the invention thereto.

In the following examples and comparative examples, the measurements and the evaluations were carried out in the following methods, and the evaluation results are shown in Tables 1 and 2.

1. Conversion of Dicarboxylic Acid Component in Step 1

The conversion of the dicarboxylic acid component in Step 1 was calculated from the following equation using an amount of distillates (g), a content of methanol (wt %) in the distillate measured by a gas chromatography (GC), and a theoretical amount of distilled methanol (g).

GC measurement was conducted using GC353 available from GL Science Co., Ltd. equipped with a column TC17 available from GL Science Co., Ltd.

Conversion (mol %)=[amount of distillate (g)×methanol content (wt %)/theoretical amount (g)]×100

2. Residual ratio of sublimable diol

The oligomer solution sampled at the end of Step 2 was examined by gel permeation chromatography (GPC) to determine the concentration (wt %) of unreacted sublimable diol remaining therein.

GPC measurement was conducted using GPC System 21 available from Showa Denko Co., Ltd. equipped with two KF-801 columns, one KF-802.5 column and one KF-803L column all available from Showa Denko Co., Ltd. under the following conditions:

Column temperature: 40° C.

Eluent: THF

Flow rate: 1.0 ml/min

Detector: differential refractometer

From the concentration thus calculated, the residual ratio of the sublimable diol was calculated according to the following equation.

Residual ratio (wt %)=[(total initial charge (g)−total distillate (g))×calculated concentration (wt %)/charged sublimable diol (g)]×100

3. Incorporation Ratio of Sublimable Diol

The content of the sublimable diol to the dicarboxylic acid component in the resulting copolyester resin (copolymerization ratio of sublimable diol) was determined by $^1$H-NMR measurement using NM-AL400 available from Nippon Denshi Co., Ltd., at 400 MHz with heavy chloroform solvent.

The ratio of the sublimable diol constituting the copolyester resin to the total sublimable diol added to the reaction system was calculated as the incorporation ratio from the following formula:

Incorporation ratio (mol %)=[measured copolymerization ratio (mol %)/theoretical copolymerization ratio (mol %)]×100

The theoretical copolymerization ratio of the sublimable diol was calculated from the following formula:

Theoretical Copolymerization ratio (mol %)=[charged SPG (mol)/ charged dicarboxylic acid component (mol)]×100

4. Adhesion of Sublimable Diol to Pressure-Reduced Pipes of Polycondensation Apparatus After completion of the polycondensation reaction, the pressure-reduced pipes were visually observed to evaluate the adhesion according to the following ratings:

A: No adhesion of sublimable diol

B: Slight adhesion of sublimable diol

C: Clogging with sublimable diol

EXAMPLES 1–5

Into a 150-L apparatus for polyester production equipped with a packed rectification column, a partial condenser, a total condenser, a cold trap, agitating blades, a heater and a nitrogen inlet, were charged the monomers in amounts shown in Table 1. After adding manganese acetate tetrahydrate in an amount of 0.03 mol % based on dimethyl terephthalate, the temperature was raised under ordinary pressure in nitrogen atmosphere. The by-produced methanol of the transesterification reaction started to be distilled off when the inner temperature reached 150 to 160° C. Then, the inner temperature was raised up to 200° C. to continue the transesterification reaction until the conversion of the dicarboxylic acid component reached the value shown in Table 1 (Step 1).

After adding 0.02 mol % of antimony trioxide and 0.06 mol % of trimethyl phosphate, each based on dimethyl terephthalate, the pressure was reduced to the value shown in Table 1 while elevating the temperature to 220° C., followed by removal of ethylene glycol by distillation until the molar ratio of the diol component to dimethyl terephthalate reached the value shown in Table 1 (Step 2).

Then, the temperature was gradually increased and the pressure was gradually reduced to carry out the polycondensation reaction finally at 270° C. under 100 Pa or lower. The viscosity of the reaction product mixture was gradually increased, and the reaction was stopped when the melt viscosity reached an appropriate level to obtain a copolyester resin (Step 3).

TABLE 1

| Amount of monomers charged (mol) | Examples | | | | |
|---|---|---|---|---|---|
| | 1 | 2 | 3 | 4 | 5 |
| DMT | 293.7 | 277.3 | 251.0 | 199.3 | 117.8 |
| EG | 572.8 | 2190.6 | 426.7 | 408.5 | 426.8 |
| SPG | 14.7 | 27.7 | — | 89.7 | 106.7 |
| DOG | — | — | 75.3 | — | — |
| Molar ratio of diol component to DMT (initial charge) | 2.0 | 8.0 | 2.0 | 2.5 | 3.0 |

TABLE 1-continued

| Amount of monomers charged (mol) | Examples | | | | |
|---|---|---|---|---|---|
| | 1 | 2 | 3 | 4 | 5 |
| Conversion of dicarboxylic acid component at the end of Step 1 (mol %) | 90 | 85 | 90 | 90 | 93 |
| Pressure at the end of Step 2 (kPa) | 40 | 20 | 80 | 15 | 15 |
| Molar ratio of diol component to DMT at the end of Step 2 | 1.5 | 2.0 | 1.7 | 1.5 | 1.3 |
| Residual ratio of sublimable diol at the end of Step 2 (wt %) | 3.0 | 8.0 | 4.0 | 3.0 | 3.0 |
| Copolymerization ratio of sublimable diol in polyester resin (mol %) | 4.9 | 9.6 | 29.3 | 44.4 | 59.0 |
| Theoretical copolymerization ratio of sublimable diol in polyester resin (mol %) | 5.0 | 10.0 | 30.0 | 45.0 | 60.0 |
| Incorporation rate of sublimable diol (mol %) | 98.0 | 96.0 | 97.7 | 98.7 | 98.3 |
| Adhesion of sublimable diol to pressure-reduced conduits | A | A | A | A | A |

DMT: dimethyl terephthalate
EG: ethylene glycol
SPG: 3,9-bis(1,1-dimethyl-2-hydroxyethyl)-2,4,8,10-tetraoxaspiro[5.5]undecane
DOG: 5-methylol-5-ethyl-2-(1,1-dimethyl-2-hydroxyethyl)-1,3-dioxane

COMPARATIVE EXAMPLE 1

The same procedure as in Example 2 was repeated except for omitting Step 2. The results are shown in Table 2.

COMPARATIVE EXAMPLE 2

The same procedure as in Example 3 was repeated except for changing the molar ratio of the diol component to DMT at the end of Step 2. The results are shown in Table 2.

COMPARATIVE EXAMPLE 3

The same procedure as in Example 4 was repeated except for the pressure condition at the end of Step 2. The results are shown in Table 2.

TABLE 2

| Amount of monomers charged (mol) | Comparative Examples | | |
|---|---|---|---|
| | 1 | 2 | 3 |
| DMT | 277.3 | 251.0 | 199.3 |
| EG | 2190.6 | 426.7 | 408.5 |
| SPG | 27.7 | — | 89.7 |
| DOG | — | 75.3 | — |
| Molar ratio of diol component to DMT (initial charge) | 8.0 | 2.0 | 2.5 |
| Conversion of dicarboxylic acid component at the end of Step 1 (mol %) | 85 | 90 | 90 |
| Pressure at the end of Step 2 (kPa) | — | 80 | 100 |
| Molar ratio of diol component to DMT at the end of Step 2 | 8.0* | 1.9 | 2.3 |
| Residual ratio of sublimable diol at the end of Step 2 (wt %) | 25.0* | 13.0 | 17.0 |
| Copolymerization ratio of sublimable diol in polyester resin (mol %) | 8.9 | 28.2 | 41.7 |
| Theoretical copolymerization ratio of sublimable diol in polyester resin (mol %) | 10.0 | 30.0 | 45.0 |
| Escaped amount of sublimable diol (wt %) | 11.0 | 6.0 | 7.3 |
| Adhesion of sublimable diol to pressure-reduced conduits | B | C | C |

*Value at the initiation of Step 3
DMT: dimethyl terephthalate
EG: ethylene glycol
SPG: 3,9-bis(1,1-dimethyl-2-hydroxyethyl)-2,4,8,10-tetraoxaspiro[5.5]undecane
DOG: 5-methylol-5-ethyl-2-(1,1-dimethyl-2-hydroxyethyl)-1,3-dioxane According to the process of the present invention, the intended copolyester can be obtained by increasing the conversion of a sublimable diol in the reaction of a dicarboxylic acid and/or an ester-forming derivative thereof with a sublimable diol and a non-sublimable diol. In addition, the process provides a stable production method of the copolyester resin without clogging pressure-reduced pipes, etc. of an apparatus for polyester resin production, and therefore, is of grate industrial value.

What is claimed is:

1. A process for producing a copolyester resin comprising a dicarboxylic acid constituting unit derived from a dicarboxylic acid and/or an ester-forming derivative thereof and a diol constituting unit derived from a sublimable diol and a non-sublimable diol, and containing a constituting unit derived from the sublimable diol in an amount of 5 to 60 mol % based on the diol constituting unit, the process comprising:
    a step 1 for producing an oligomer by the reaction of the dicarboxylic acid and/or the ester-forming derivative thereof with the sublimable diol and the non-sublimable diol in the presence of the non-sublimable diol in excess of the amount of the non-sublimable diol for constituting the copolyester resin, while distilling off water and/or alcohol generated from the ester-forming derivative from the reaction system until a conversion of the dicarboxylic acid and/or the ester-forming derivative reaches 85 mol % or more;
    a step 2 for subjecting the oligomer to transesterification reaction while distilling off mainly the non-sublimable diol at 150 to 250° C. under a pressure not higher than a vapor pressure of the non-sublimable diol but not lower than a vapor pressure of sublimable diol until an amount of the sublimable diol remaining in an oligomer solution is reduced to 10% by weight or less based on the sublimable diol added to the reaction system; and
    a step 3 for increasing the molecular weight of the oligomer under further reduced pressure.

2. The process according to claim 1, wherein the sublimable diol is at least one compound selected from the group consisting of 3,9-bis(1,1-dimethyl-2-hydroxyethyl)-2,4,8,10-tetraoxaspiro [5.5]undecane and 5-methylol-5-ethyl-2-(1,1-dimethyl-2-hydroxyethyl)-1,3-dioxane.

3. The process according to claim 1, wherein the sublimable diol has a rate of transesterification reaction and/or esterification reaction lower than that of the non-sublimable diol.

4. The process according to claim 1, wherein the non-sublimable diol is added in the step 1 in an amount 1.3 to 10 times by mol excess to the non-sublimable diol for constituting the copolyester resin.

5. The process according to claim 1, wherein the amount of the sublimable diol constituting the copolyester resin at the end of the step 3 is 95% by mol or more of the amount of the sublimable diol that is added to the reaction system in the step 1.

6. The process according to claim 1, wherein the final reaction pressure in the step 1 is 40 to 600 kPa, and the reaction pressure in the step 3 is 400 Pa or lower.

7. The process according to claim 2, wherein the amount of the sublimable diol constituting the copolyester resin at the end of the step 3 is 95% by mol or more of the amount of the sublimable diol that is added to the reaction system in the step 1.

8. The process according to claim 3, wherein the amount of the sublimable diol constituting the copolyester resin at the end of the step 3 is 95% by mol or more of the amount of the sublimable diol that is added to the reaction system in the step 1.

9. The process according to claim 2, wherein the final reaction pressure in the step 1 is 40 to 600 kPa, and the reaction pressure in the step 3 is 400 Pa or lower.

10. The process according to claim 3, wherein the final reaction pressure in the step 1 is 40 to 600 kPa, and the reaction pressure in the step 3 is 400 Pa or lower.

11. The process according to claim 4, wherein the final reaction pressure in the step 1 is 40 to 600 kPa, and the reaction pressure in the step 3 is 400 Pa or lower.

* * * * *